United States Patent
Oya (10) Patent No.: US 7,796,161 B2
(45) Date of Patent: Sep. 14, 2010

(54) CAMERA CONTROL APPARATUS, METHOD FOR CONTROLLING CAMERA, AND STORAGE MEDIUM

(75) Inventor: Takashi Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1177 days.

(21) Appl. No.: 11/152,592

(22) Filed: Jun. 14, 2005

(65) Prior Publication Data

US 2005/0285950 A1 Dec. 29, 2005

(30) Foreign Application Priority Data

Jun. 25, 2004 (JP) .............................. 2004-188246

(51) Int. Cl.
 *H04N 7/18* (2006.01)
 *H04N 5/225* (2006.01)
 *H04N 5/232* (2006.01)

(52) U.S. Cl. .................... 348/211.6; 348/143; 348/155; 348/169

(58) Field of Classification Search .................. 348/143, 348/152, 154, 155, 169–172, 211.6
See application file for complete search history.

(56) References Cited

U.S. PATENT DOCUMENTS

| 6,055,014 A | 4/2000 | Hosonuma et al. |
| 2003/0142209 A1 | 7/2003 | Yamazaki |
| 2003/0174253 A1* | 9/2003 | Ito et al. ..................... 348/699 |
| 2003/0227548 A1 | 12/2003 | Kawakami et al. |

FOREIGN PATENT DOCUMENTS

| JP | 3-235594 A | 10/1991 |
| JP | 09-037140 | 2/1997 |
| JP | 10-023316 | 1/1998 |
| JP | 11-150676 A | 6/1999 |
| JP | 2002-369182 | 12/2002 |
| JP | 2003-219225 A | 7/2003 |
| JP | 2003-255442 A | 9/2003 |

* cited by examiner

*Primary Examiner*—David L Ometz
*Assistant Examiner*—Dillon Durnford-Geszvain
(74) *Attorney, Agent, or Firm*—Canon USA Inc IP Div (57) ABSTRACT

A control apparatus controlling a state of an imaging apparatus and a method for controlling an imaging device. According to the present invention, when a moving area in shot images are detected and parameter control of an imaging device is performed, if the moving area relates to a predetermined shooting prohibited area, the parameter control of the imaging device is stopped.

24 Claims, 11 Drawing Sheets

| ATTRIBUTE | MINIMUM VALUE | MAXIMUM VALUE |
|---|---|---|
| PAN | −150.3 | 60.2 |
| TILT | None | 50.0 |
| ZOOM | None | 2.3 |
| ... | ... | ... |

| PRESET NUMBER | STOP POINT NUMBER | STOPPAGE TIME | PAN | TILT | ZOOM |
|---|---|---|---|---|---|
| 1 | 2 | 5 | -85.3 | 10.2 | 1.0 |
| 2 | 4 | 10 | -5.1 | -2.9 | 2.6 |
| 3 | 1 | 6 | 17.3 | 16.2 | 1.3 |
| 4 | - | 8 | 79.1 | 8.4 | 1.8 |

CAMERA CONTROL APPARATUS, METHOD FOR CONTROLLING CAMERA, AND STORAGE MEDIUM

BACKGROUND OF THE INVENTION

1. Field of the Invention

The present invention relates to a control apparatus, a method for controlling an imaging device, and a storage medium.

2. Description of the Related Art

Cameras that can be controlled remotely with a personal computer (PC) are commercially available. Sets of camera parameters such as pan, tilt, and zoom can be preset in these cameras. The monitoring system using these cameras can perform parameter control of the camera in the preset order. This operation is called a preset tour. Japanese Patent No. 2548814 discloses a process for detecting movement in the images, the process being performed at each preset point in the preset tour. In this case, when the camera moves from one preset point to another preset point, the motion detection is stopped so as to prevent error detection.

When images of a camera capable of controlling pan, tilt, and zoom are put on the internet, it is desired to keep part of the field of view private. In response to such desire, some commercially available network cameras can limit the field of view.

Various techniques concerning tracking of a moving object are proposed. For example, Japanese Patent Laid-Open No. 11-150676 discloses a tracking control technique based on the color of the moving object and a histogram. In addition, a technique in which part of the moving object is stored as a template and tracking is performed, and a technique in which tracking is performed on the basis of the motion vector are known. In addition, Japanese Patent Laid-Open No. 2003-219225 (corresponding to U.S. Patent Application No. 2003/142209) discloses a technique in which a moving area is detected from the interframe difference and tracking is performed, and then the color of the object is stored and tracking is continued.

Moreover, Japanese Patent Laid-Open No. 2003-255442 (corresponding to U.S. Patent Application No. 2003/227548) discloses a technique used for a preset tour. In this technique, movement in the images is detected at each preset point. If there is any movement, the camera tracks the moving object. Camera control of this technique includes a preset tour mode and a tracking mode. The preset tour control is stopped during tracking.

In the conventional techniques, the limitation of visible (field of view) range and the automatic tracking are not used together. Therefore, the operation for the case where a shooting prohibited state occurs in the automatic tracking is not taken into account. After transition is made from the preset tour to the tracking process, the tracking process is stopped according to predetermined conditions. However, it is not taken into account how to return to the preset tour. In the case where a plurality of visible-range limited areas are specified in the image, if the camera moves straight from one preset point to another preset point, the camera may pass through the visible-range limited area.

SUMMARY OF THE INVENTION

The present invention is directed to a control apparatus. In one aspect of the present invention, a control apparatus controlling a state of an imaging device includes a motion detection device detecting a moving area in shot images, and a control device controlling a parameter of the imaging device according to the detected moving area. When the moving area corresponds to a predetermined shooting prohibited state, the control device stops the parameter control of the imaging device. In this aspect, the present invention provides a control apparatus capable of performing an appropriate camera control even when the detected moving area relates to a shooting prohibited area.

In another aspect of the present invention, a control apparatus controlling a state of an imaging device includes a motion detection device detecting a moving area in shot images, and a control device performing parameter control of the imaging device according to the detected moving area. When the moving area relates to a predetermined shooting prohibited state, the control device resets the imaging area to a shooting permitted area that includes the moving area and is adjacent to a visible-range limited area, and then the control device performs the parameter control of the imaging device.

In this aspect, the present invention provides a control apparatus capable of appropriately performing a preset tour under a condition that there is a visible-range limited area.

In yet another aspect of the present invention, a camera control apparatus controlling a state of an imaging device includes a storage device storing a control state of the imaging device, a control device controlling the imaging device cyclically in order on the basis of the stored control state, and a motion detection device detecting a moving area in shot images. When a moving area is detected by the motion detection device, the control device performs parameter control of the imaging device according to the detected moving area. When the parameter control of the imaging device according to the moving area is stopped, the imaging device is controlled so as to be in a state based on the stored control state.

In this aspect, the present invention provides a control apparatus in which when transition is made from the automatic tracking to the preset tour, the preset tour can be resumed from an appropriate preset point.

Further features and advantages of the present invention will become apparent from the following description of exemplary embodiments (with reference to the attached drawings).

DESCRIPTION OF THE EMBODIMENTS

The embodiments of the present invention will now be described with reference to the drawings.

First Embodiment

In a moving-object tracking system according to this embodiment, when a target object enters a shooting prohibited area, a camera stops tracking and returns to the original motion-detecting position.

Figure 1:
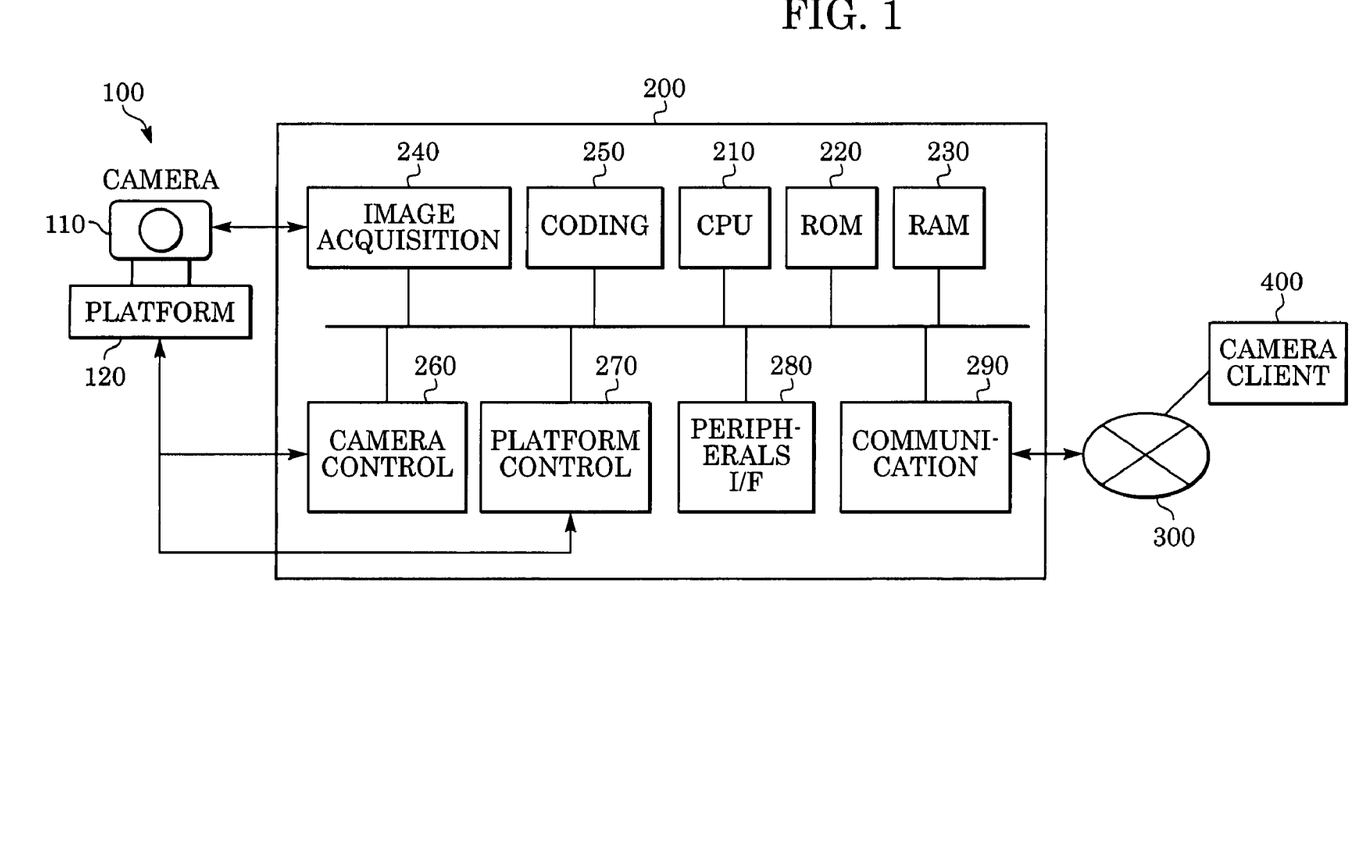
FIG. 1 shows an example of a hardware configuration of a camera control apparatus.

FIG. 1 shows an example of a moving-object tracking system according to this embodiment. This system includes a camera apparatus 100, a camera control apparatus 200, and a camera client 400. The camera apparatus 100 includes an optical system 110 and a platform 120, and is connected to the camera control apparatus 200 via a signal line. The camera apparatus 100 further includes a control circuit (not shown) used for focus, exposure, shutter speed, and so on, and automatically controls the optical system 110 to take the optimum image. A commercially available camera that can be controlled with a computer may be used for the camera apparatus 100. The camera client 400 can display the image from the camera control apparatus 200, and can remotely control various states of the camera apparatus 100. The camera client 400 includes a personal computer that can run image reception software and camera control software.

The camera control apparatus 200 includes a CPU 210, a ROM 220, a RAM 230, an image acquisition circuit 240, a coding circuit 250, a camera control circuit 260, a platform control circuit 270, and a peripherals interface 280, which are connected via internal buses. The camera control apparatus 200 can transmit images and the states of the camera apparatus 100 to a network 300 and can receive control signals via a communication unit 290. The coding circuit 250 encodes the images. Standards of image encoding include JPEG, MPEG-1, MPEG-2, MPEG-4, and H.264. However, this embodiment does not depend on an encoding standard. The camera control apparatus 200 can be a computer including an image acquisition circuit and a coding circuit, and can be configured using existing techniques.

In FIG. 1, the camera apparatus 100 and the camera control apparatus 200 are separated. However, this is only an example of a hardware configuration of this embodiment. The camera apparatus 100 and the camera control apparatus 200 may be integrated in appearance. Alternatively, the camera apparatus 100 may be connected to a general-purpose PC. In this case, an external display is connected to a video circuit (not shown), and a mouse and a keyboard are connected to the peripherals interface 280.

Figure 2:
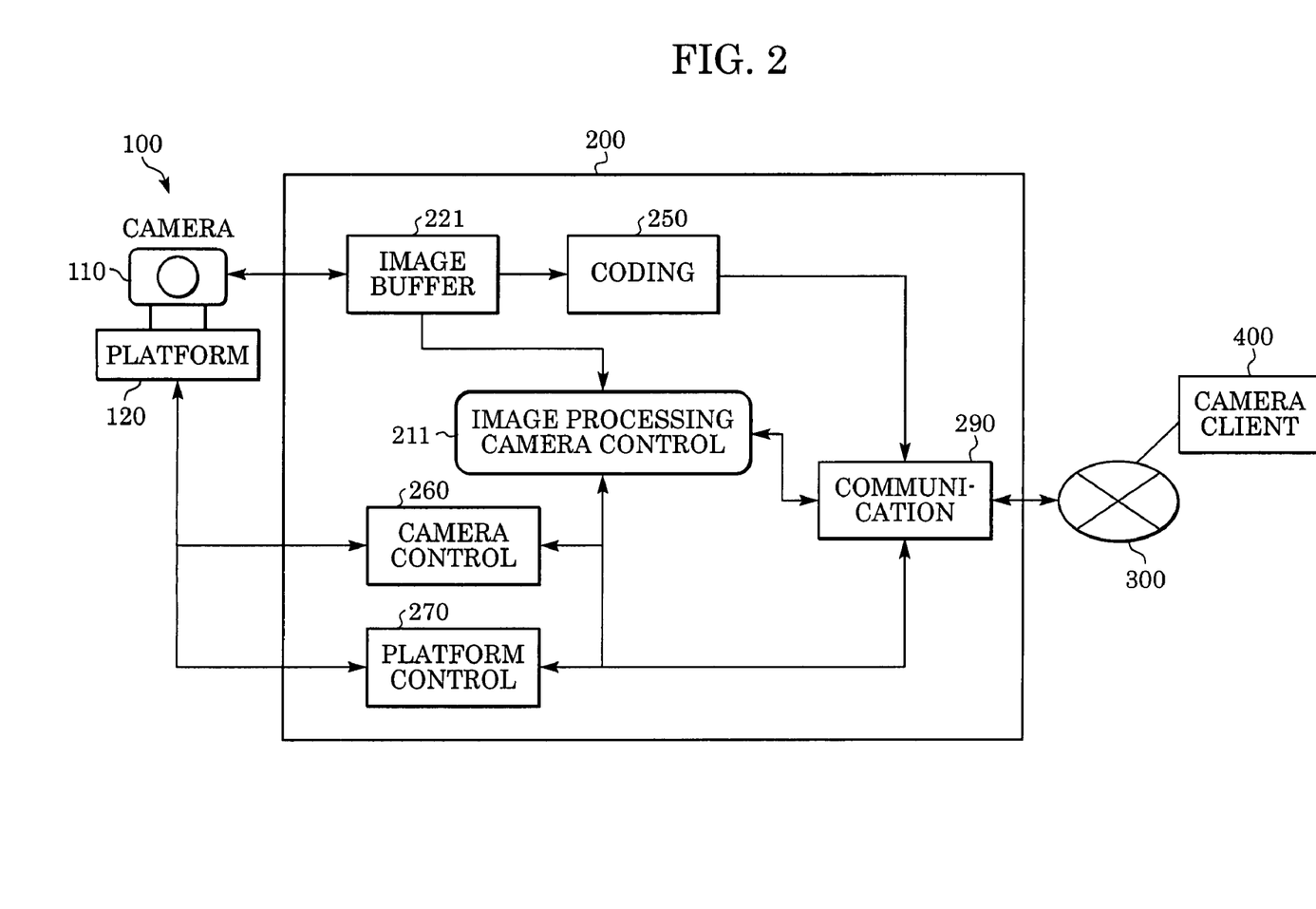
FIG. 2 shows an example of a functional module of a camera control apparatus.

FIG. 2 shows a functional block of the hardware viewed from the perspective of the camera control processing and the image processing. In other wards, FIG. 2 shows the flow of the image signals and the control signals in FIG. 1. Therefore, the same reference numerals will be used to designate the same blocks as those in FIG. 1. The functional block includes the camera apparatus 100 and the camera control apparatus 200. The camera apparatus 100 is the same as that in FIG. 1. The camera control apparatus 200 includes an image-processing/camera-control unit 211, an image buffer 221, the coding unit 250, the camera control unit 260, the platform control unit 270, and the communication unit 290. The image buffer 221 is physically the RAM 230. The image-processing/camera-control unit 211 is physically the CPU 210.

The flow of the image signals will be described. First, images are acquired from the camera 110 and accumulated in the image buffer 221. The images accumulated in the image buffer 221 are encoded in the coding circuit 250, and transmitted to the network 300 via the communication circuit 290. The camera client (PC) 400 is connected to the network 300 and receives the transmitted images. The camera client (PC) 400 is capable of displaying the images on a display and storing the images in a storage. On the other hand, the images are also transmitted from the image buffer 221 to the image-processing/camera-control unit 211 where the motion detection processing is performed. If any movement is detected, a control signal for training the camera on the movement is created and transmitted to the camera control unit 260 and the platform control unit 270 so as to control the camera.

The motion detection processing of the images is performed on the basis of, for example, a difference between the images. Well-known difference methods include the interframe difference and the background difference. In the calculation of the interframe difference, the absolute value of brightness difference between pixels with the same coordinates or the sum of absolute value of difference in DCT coefficient in units of JPEG encoding blocks is used. When the integrated value of such difference result concerning an object area exceeds a predetermined threshold, it is determined that there is movement. However, the present invention does not depend on any particular method for motion detection.

Figure 3A:
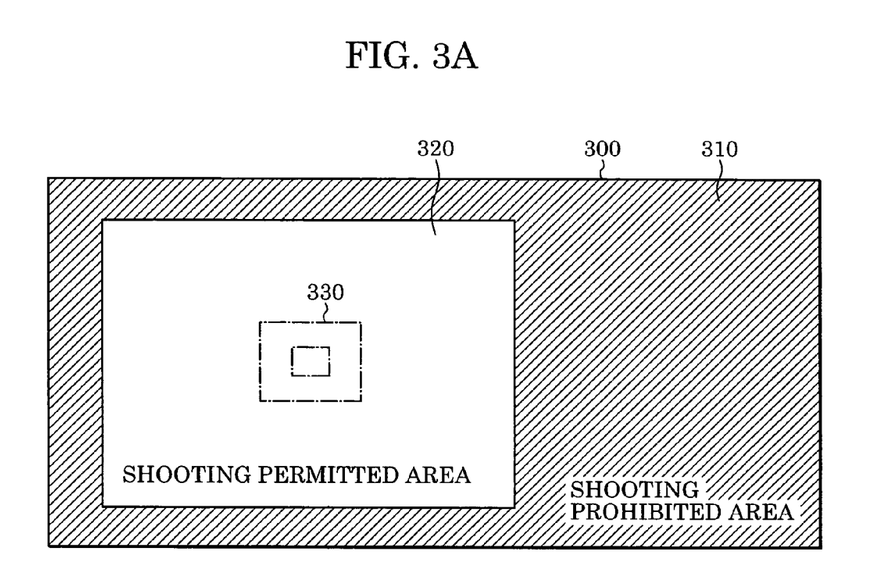
FIGS. 3A and 3B illustrate a visible range area.
Figure 3B:
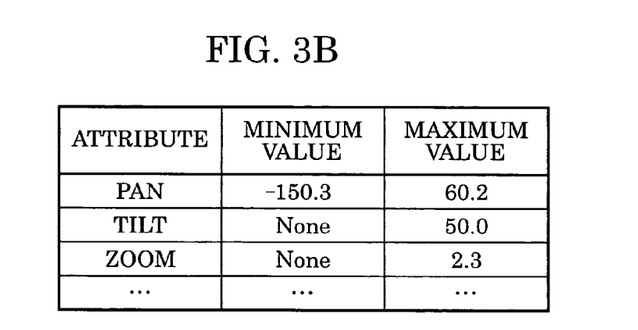

FIGS. 3A and 3B show an example of a shooting prohibited area in this embodiment. FIG. 3A is an example of a GUI for specifying the range where pan, tilt, and zoom are possible from the viewpoint of the shootable range. In FIG. 3A, the range where the camera control is possible is shown using the field of view. Reference numeral 300 denotes the entire field of view. Determining the shooting permitted area 320 at which the camera can be pointed determines the panable range and the tiltable range. The wide-angle end and the telephoto end of zooming are specified by operating two similar rectangles 330. Determining the shooting permitted area 320 determines a shooting prohibited area 310 at which the camera cannot be pointed.

This GUI may be displayed on a display of the camera client (PC) 400 connected to the camera control apparatus 200 via the network. Alternatively, this GUI may be displayed on a display directly connected to the camera control apparatus 200. As a device for specifying a position on the GUI, a mouse, a touch panel display, and so on may be used.

As a result, the data of control permitted area is obtained. As shown in FIG. 3B, the data includes maximum values and minimum values of pan, tilt, and zoom. Here, "None" shows that there is no limit. The data shown in FIG. 3B may be directly inputted. The range of attributes other than pan, tilt, and zoom may be specified.

Figure 4:
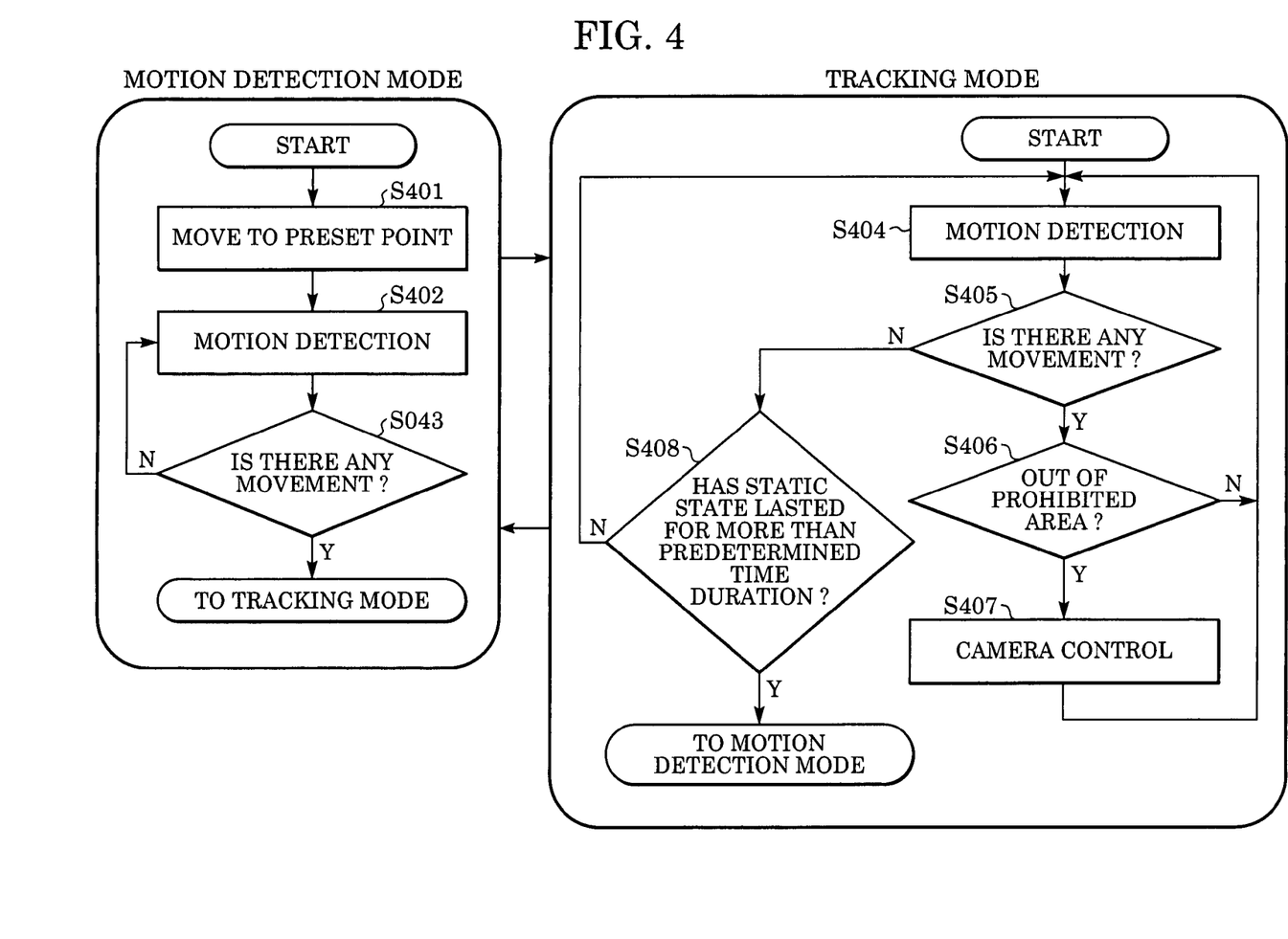
FIG. 4 shows a procedure of an automatic tracking operation in the case where the visible range is limited.

The software process in this embodiment will be described with reference to the flow chart of FIG. 4. The process of this flow chart is performed by the CPU 210 of the camera control apparatus 200 according to the programs stored in the ROM 220.

The operating state of the tracking apparatus in this embodiment includes two modes, that is to say, a motion detection mode and a tracking mode. If any moving area is detected in the motion detection mode, transition to the tracking mode is made. In the tracking mode, the camera is trained on the movement. If the object is lost in the tracking mode, a return to the motion detection mode is made.

In the motion detection mode, first, in S401, the camera is aimed at a preset point where the motion detection is to be performed. Next, the above-described motion detection process is performed in S402, and presence or absence of movement is determined in S403. If there is no movement, a return to S402 is made, and the detection process is continued. If there is movement, transition to the tracking mode is made.

In the tracking mode, first, the motion detection is performed again in S404. The difference between the detection process in the motion detection mode and that in the tracking mode is as follows. The detection process in the motion detection mode is performed with respect to a specific portion in the image. The reason is that in the motion detection mode, a portion where movement is expected, for example, a doorway is often specified. On the other hand, the detection process in the tracking mode is performed with respect to the entire screen. The reason is that in the tracking mode, it is desired to detect the object with respect to as wide a range as possible.

After the motion detection process, presence or absence of movement is determined in S405. If there is no movement, the continuity of the static state is checked in S408. If the static state has lasted for more than a predetermined time duration (for example, five seconds), transition to the motion detection mode is made. If the static state is shorter than the predetermined time duration, a return to S404 is made, and the motion detection is performed again.

If it is determined that there is movement, transition to S406 is made, and it is determined whether the target point is out of the shooting prohibited area. If the target point is out of the shooting prohibited area (within the shooting permitted area), transition to S407 is made, and the camera is controlled so as to perform tracking. If the target point is within the shooting prohibited area (out of the shooting permitted area), the camera stops tracking, a return to S404 is made, and the motion detection is continued.

In S407, the area in the image where there is movement is obtained on the basis of the information obtained in the motion detection process S404, and the camera is controlled so that the center of mass of the area is located in the center of the image. After the camera control is completed and the camera is stabilized, the motion detection process S404 is repeated. The reason is that if an image processing such as the interframe difference is performed when the camera is moving, blurring of images is caused by the movement of the camera, and consequently error detection occurs. Of course, this embodiment does not depend on any particular tracking method. Therefore, tracking may be performed continuously by storing the features of the moving object such as color, pattern, and edge.

This embodiment is a tracking system using an attitude-controllable camera. As is clear from the above description, since the camera is not trained on the shooting prohibited area in tracking, the tracking system according to this embodiment can perform tracking even when there is a visible-range limited area such as the shooting prohibited area.

Second Embodiment

A system in which a shooting prohibited area can be specified in units of blocks will be described with reference to FIG. 5.

Figure 5:
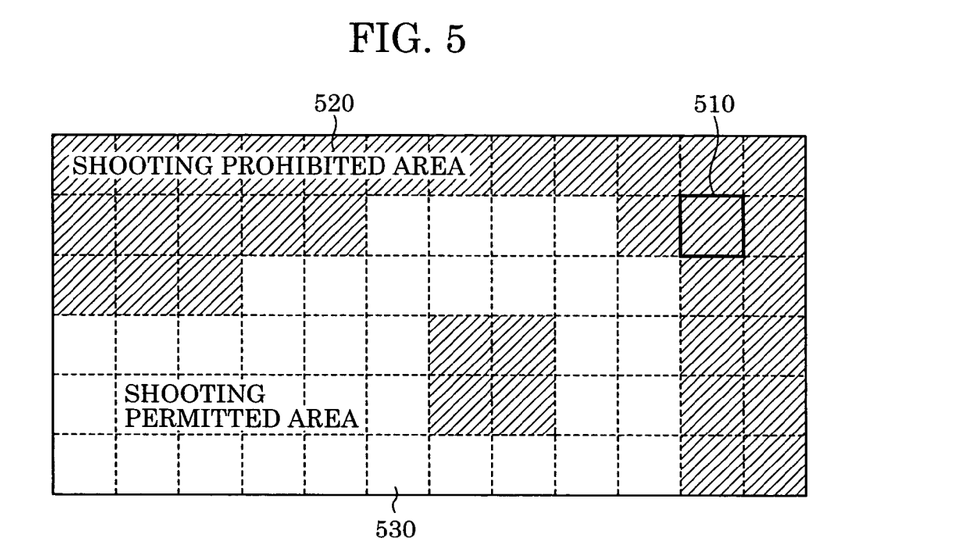
FIG. 5 illustrates another method for specifying a visible range area.

In FIG. 5, as in FIG. 3A, the field of view of the camera is shown. The entire area is divided evenly into blocks 510. A visible-range limited area, that is to say, a shooting prohibited area 520 is specified in units of the blocks 510. As a result, for example, a shooting prohibited area 520 and a shooting permitted area 530 can be specified. In the case where a visible-range limited area is specified in this manner, in order to determine whether a pan-tilt value is within the shooting permitted area, it is detected whether a rectangular portion of the field of view of the camera overlaps the shooting prohibited area.

In this embodiment, the same effect is achieved by specifying the shooting permitted area instead of specifying the shooting prohibited area. Although the blocks shown in FIG. 5 are equal in size and shape, of course, the blocks may be uneven in size and shape.

As described above, in this embodiment, the shooting prohibited area (or the shooting permitted area) is specified in units of blocks. Therefore, if this embodiment is used in the system of the first embodiment, noncontiguous shooting-prohibited areas can be specified.

Third Embodiment

A system according to a third embodiment will be described. In this system, when the object moves toward the visible-range limited area (a shooting prohibited area), the camera tracks the object up to the point adjacent to the shooting prohibited area, that is to say, up to the limit of the shooting permitted area.

Figure 6:
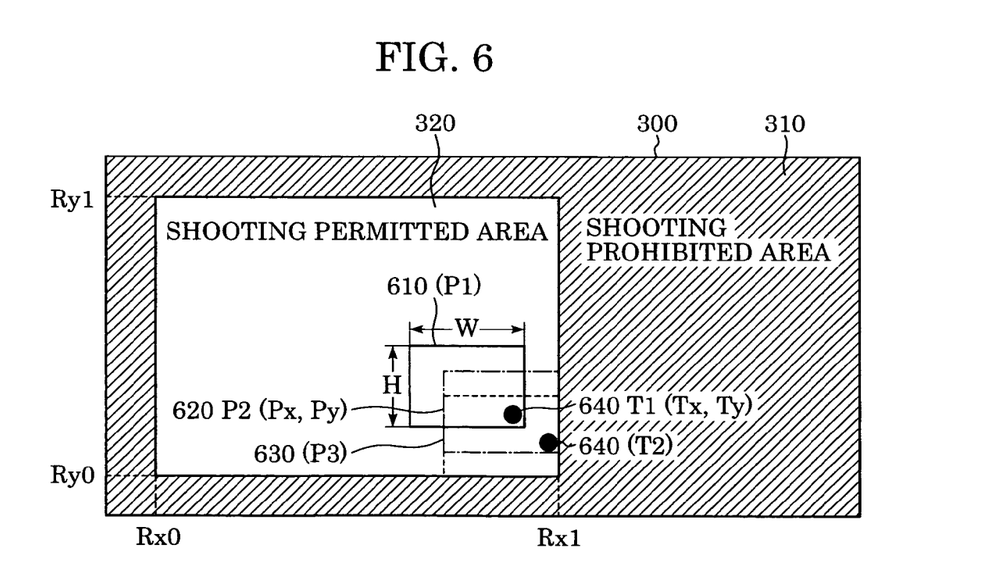
FIG. 6 illustrates a tracking operation in the case where the object is located in the vicinity of the visible-range limited area.

FIG. 6 illustrates the camera control in this embodiment. As in FIG. 3A, there are a shooting prohibited area 310 and a shooting permitted area 320. Reference numeral 610 denotes the present field of view of the camera, and the center of the field of view is the pan-tilt angle. Next, the position of the object 640 is measured, and the camera is trained on the object. In this case, in the tilting direction, since there is sufficient distance to the shooting prohibited area, the object can be located in the center of the field of view. However, in the panning direction, since there is not sufficient distance to the shooting prohibited area, the object cannot be located in the center of the field of view. That is to say, if the object is located in the center of the field of view in the panning direction, the field of view overlaps the visible-range limited area. Therefore, in the panning direction, the camera is moved up to the limit of the shooting permitted area.

The limit is obtained as follows. In FIG. 6, when the camera is located at P1 and the object is located at T1 (Tx, Ty), the next camera position P2 (Px, Py) is obtained as follows:

$$Px = \text{Min}(Px', Rx1 - W/2), Px' = \text{Max}(Rx0 + W/2, Tx)$$

$$Py = \text{Min}(Py', Ry1 - H/2), Py' = \text{Max}(Ry0 + H/2, Ty)$$

The shooting permitted area is (Rx0, Ry0)–(Rx1, Ry1), and the viewing angle of the camera is (W, H). The shooting permitted area is wider than the viewing angle, that is to say, Rx1−Rx0>W and Ry1−Ry0>H.

In FIG. 6, Tx>Rx0+W/2 and Tx>Rx1−W/2, therefore Px=Rx1−W/2. As a result, although the camera is trained on the object in the tilting direction, the camera is panned up to the limit of the shooting permitted area. Next, when the camera is located at P2 and the object is located at T2, the object cannot be located in the center of the field of view in both the panning and tilting directions. Therefore, the camera is moved to P3 (Rx1−W/2, Ry1−H/2).

Camera-control authority with priority may be granted. The control authority is exclusive and granted in order to avoid confusion when a plurality of users try to control the camera at the same time. For example, when a plurality of camera clients are connected to the network 300 in FIG. 1, the client having the control authority can control the parameters such as pan angle and tilt angle of the camera 100. However, other clients having no control authority can only display the image from the camera and cannot control the parameters.

Grant and cancellation of the control authority is managed by the camera control apparatus 200. The camera control apparatus 200 grants the control authority according to a priority management table stored in advance. The priority is expressed in levels. When a client having a higher-level priority requests the camera control, a client having a lower level priority has to cede the control.

When movement is detected and tracking is performed, normally, the camera client managing these operations acquires and holds the control authority. However, due to the limitation of visible-range, the client can move the camera only within the shooting permitted area.

Depending on the level of the priority attached to the control authority, the limitation of visible-range may be lifted. In this case, the camera can be moved up to the physical limit depending on the mechanism of the camera. In S406 in the procedure of the tracking mode in FIG. 4, on the basis of the level of the priority attached to the control authority, it is determined whether the visible range is to be limited or not.

That is to say, in S406, when the priority level is high, the camera control of S407 is performed. On the other hand, when the priority level is low, the camera control of S407 is not performed.

There are various methods for determining the priority level, for example, a method in which the level differs from client to client, and a method in which the level differs from user to user. In the case of tracking, a tracking module in the camera is provided with a priority level. A higher level may be provided according to the time of day or the importance of the object. For example, when a human face is detected, the importance of the object is raised. Alternatively, when a human face is detected and he or she is a predetermined person, the priority level may be raised.

The information concerning the importance is stored in the ROM 220 or the RAM 230 of the camera control apparatus 200. In parallel with the tracking control, the CPU 210 detects a human face and determines whether he or she is a predetermined person.

As described above, in the pan-tilt control during tracking, the system according to this embodiment compares the position of the object and the shooting prohibited area. When the object is moving toward the shooting prohibited area, the camera tracks the object up to the limit of the shooting permitted area, that is to say, up to the point adjacent to the shooting prohibited area, so as to come as close as possible to the object.

Fourth Embodiment

A fourth embodiment relates to a preset tour in which the camera visits a plurality of preset points in order. The camera operation when an object to be tracked is detected in the preset tour will be described.

Figure 7:
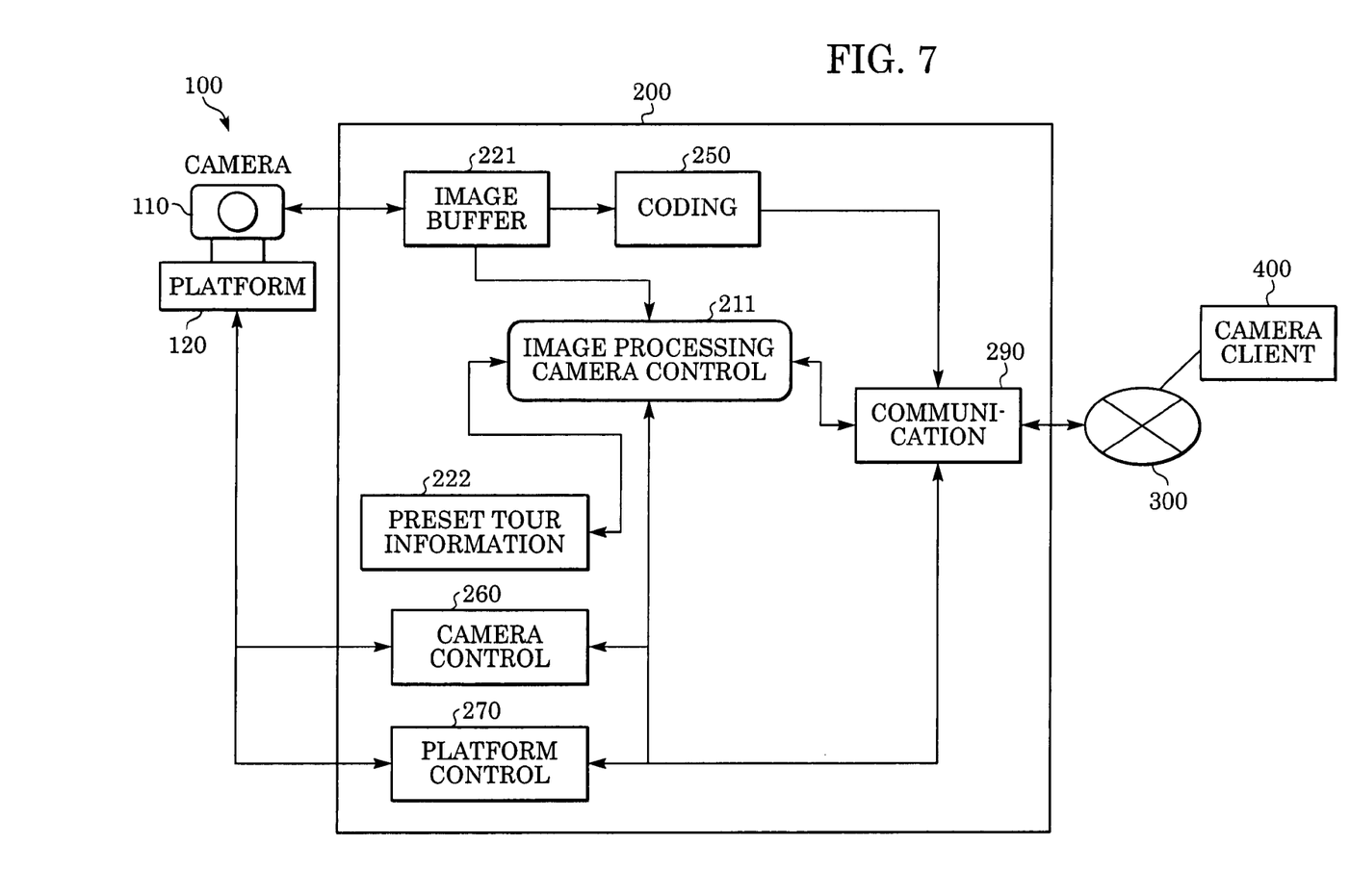
FIG. 7 illustrates a functional module of an automatic tracking apparatus in the case where a preset tour is performed.

In the case where the preset tour is performed, the hardware configuration is the same as shown in FIG. 1. Therefore, the description will be omitted. As shown in FIG. 7, the functional block is the same as shown in FIG. 2 except that preset tour information 222 is prepared, and the image-processing/camera-control unit 211 retrieves the information to control the camera. The preset tour information 222 is stored in the RAM 230.

The flow of the camera control signal in the preset tour differs from that in the automatic tracking. In the preset tour, first, the image-processing/camera-control unit 211 retrieves the first preset tour information 222 from the RAM 230, and then requests the camera control circuit 260 and the platform control circuit 270 to move the camera 100 according to predetermined parameters. Next, the control circuits train the camera on the first preset point.

On the other hand, in the automatic tracking, first, image processing is performed in the image-processing/camera-control unit 211, and consequently the location of the object on the screen is determined. Therefore, a control signal for shifting the object to the center of the screen is created in the image-processing/camera-control unit 211. Next, the camera 100 is moved by the camera control circuit 260 and the platform control circuit 270 according to the same procedure as in the preset tour.

Figure 8:
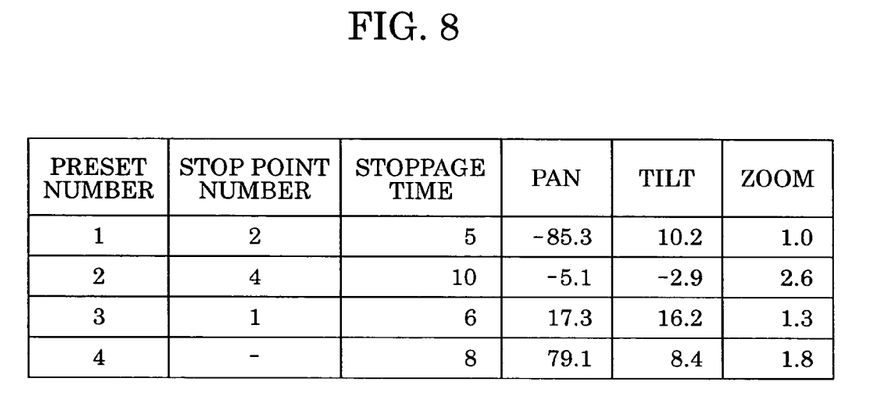
FIG. 8 shows an example of a preset tour list.

An example of the data of the preset tour information 222 stored in the RAM 230 will be described with reference to FIG. 8. The tour information includes preset number, preset point number, stoppage time, pan, tilt, and zoom. The preset point number represents the order in which the preset tour is performed. The stoppage time is the length of time of stoppage at the preset point. The pan, tilt, and zoom are parameters used for pointing the camera at the preset point. Of course, in addition to these parameters, focus information and exposure information may be recorded. For convenience of explanation, the preset information here includes parameters commonly used for automatic tracking.

Figure 9:
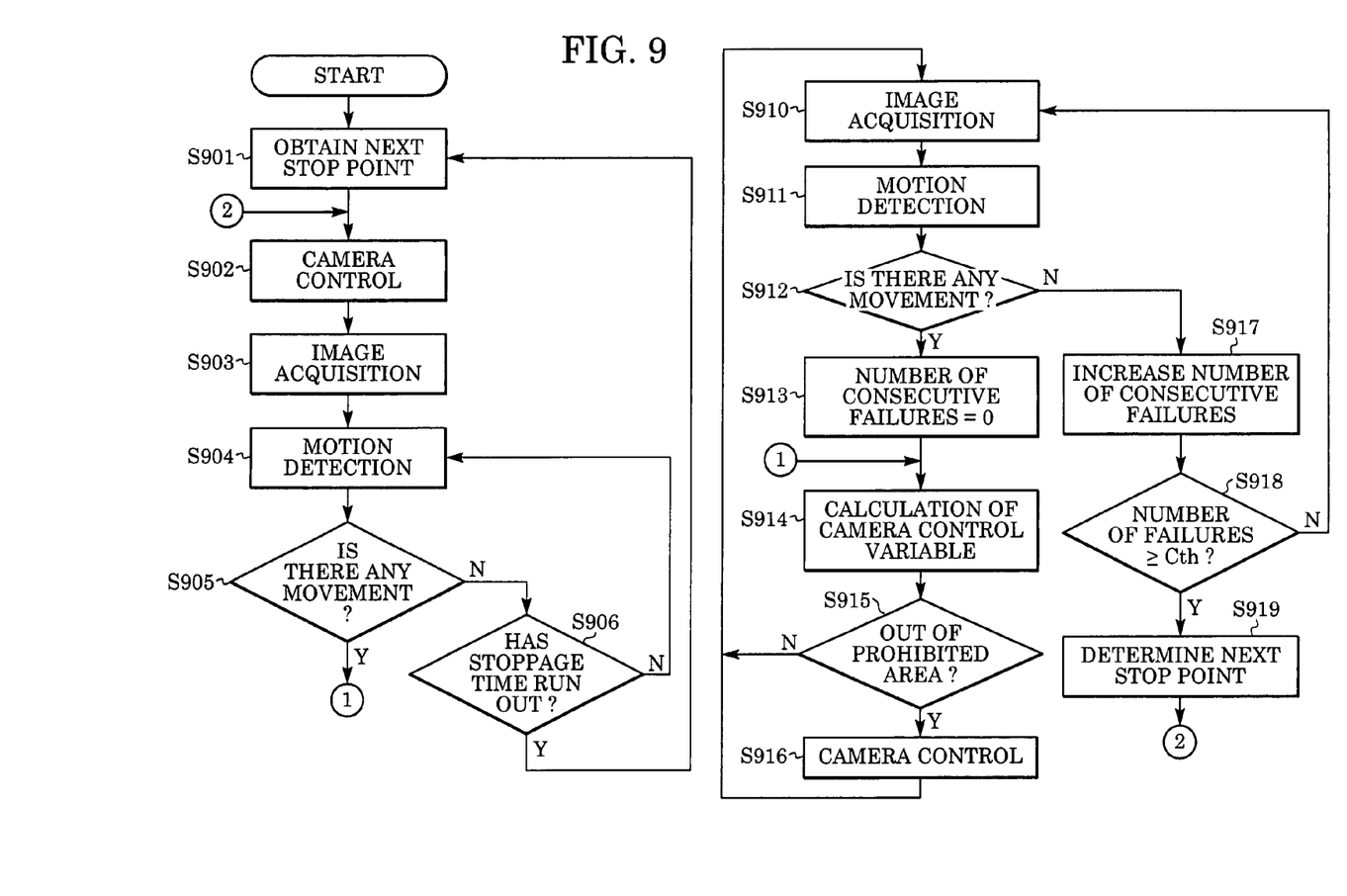
FIG. 9 shows operation procedures of a preset tour and an automatic tracking.

Next, procedures of the preset tour and the tracking process in this embodiment will be described with reference to the flow chart of FIG. 9. FIG. 9 shows only the preset tour and the tracking process. Other processes concerning, for example, automatic control of the optical system, control of the apparatus by the operation system (OS), interrupt handling, and exception handling are not described here. From S901 to S906 is the tour mode, and from S910 to S919 is the tracking mode.

First, in S901, the next preset point to be visited is obtained. If the tour has never been performed or the last tour has been completed, the next preset point is initialized. Next, in S902, the camera is pointed at the next preset point obtained in S901.

Next, in S903, a frame of image is taken with the camera 100 and stored in the image buffer 221. Next, motion detection process is performed in S904, and it is determined whether there is any movement in S905. If there is movement, transition to the tracking mode is made. If there is no movement, it is determined in S906 whether the stoppage time at the present preset point has run out. The stoppage time at each preset point can be set in the range of 1 to 120 seconds in response to the user's request, but is not limited to this range. If the time has not run out, a return to S904 is made, and the detection process is continued. If the time has run out, a return to S901 is made, and the next preset point is obtained.

If there is movement in S905, transition to the tracking mode is made. In the tracking mode, before the camera control is performed, camera control variables are calculated in S914, and it is determined in S915 whether the camera control variables are out of the shooting prohibited area. As in the first and third embodiments, the camera control variables are calculated so that the center of mass of the moving area is located in the center of the screen. If the camera control variables are out of the shooting prohibited area (within the shooting permitted area), the camera is controlled so as to perform tracking in S916. If the camera control variables are within the shooting prohibited area, transition to S910 is made.

Images are acquired in S910, and motion detection is performed in S911. The processes in S910 and S911 are the same as the processes in S903 and S904. Next, in S912, it is determined whether there is any movement. If there is any movement, the number of consecutive failures in tracking is initialized to zero in S913. Next, transition to S914 is made, and the above-described processes S914 (calculation of camera control variables) to S916 (camera control) are performed.

If there is no movement in S912, transition to S917 is made, and the number of consecutive failures in tracking is increased by one. Next, in S918, it is determined whether the number of consecutive failures is a predetermined value or more. If the number of consecutive failures is the predetermined value or more, next preset point is determined in S919, and transition to the preset tour mode is made. If the number of consecutive failures is less than the predetermined value, a return to S910 is made, and the tracking is continued.

When returning to the preset tour mode, the camera may return to the preset point the camera last visited in the preset tour mode. Alternatively, the camera may return to the first preset point (starting point). Alternatively, the camera may return to the nearest preset point. In order to find the nearest preset point, on the basis of the pan-tilt angle, a comparison of the distance from the present position is made between all preset points. If there are a plurality of nearest preset points, a comparison of another camera parameter, for example, zoom value is made, and the preset point whose zoom value is closest to the present zoom value is selected.

In the camera control from S914 to S916, the camera is not moved into the shooting prohibited area as in the first embodiment. The camera may come as close as possible to the object as in the third embodiment.

As described above, this embodiment provides an automatic tracking apparatus used for a preset tour. The automatic tracking apparatus performs motion detection and, if any movement is detected, performs tracking. If the object enters the shooting prohibited area, the automatic tracking apparatus stops tracking.

Fifth Embodiment

As a fifth embodiment, a method for making a detour in the preset tour to avoid a shooting prohibited area specified in units of blocks will be described.

Figure 10:
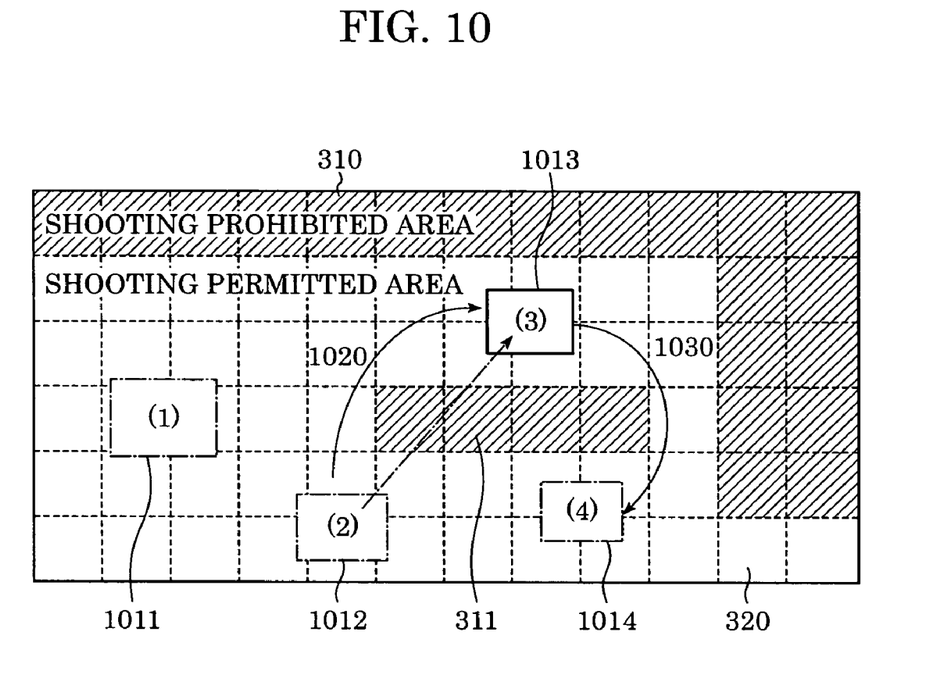
FIG. 10 is a schematic view of a visiting route of a preset tour in the case where the visible range is limited.

FIG. 10 is a schematic view showing a preset tour according to this embodiment. In FIG. 10, in the field of view, there are shooting prohibited areas 310 and 311 and a shooting permitted area 320, and preset points 1011 to 1014 are set. The shooting prohibited area 311 does not adjoin the other shooting prohibited area 310. The order of preset tour is fixed, that is to say, 1011, 1012, 1013, and 1014 in FIG. 10.

If the camera moves straight from point 1012 to point 1013 and from point 1013 to point 1014, the field of view overlaps the shooting prohibited area 311. How to determine whether the field of view overlaps any shooting prohibited areas is as follows. First, two points are connected with a straight line. Next, if any shooting prohibited areas are located within a distance of half of the diagonal of the field of view from the straight line, it is determined that the field of view overlaps the shooting prohibited areas.

If such overlapping occurs, the camera makes a detour to avoid the shooting prohibited areas. For example, when the camera moves from point 1012 to point 1013, the camera makes a detour 1020 so as to avoid the shooting prohibited area 311. Similarly, when the camera moves from point 1013 to point 1014, the camera makes a detour 1030 so as to avoid the shooting prohibited area 311.

Figure 11A:
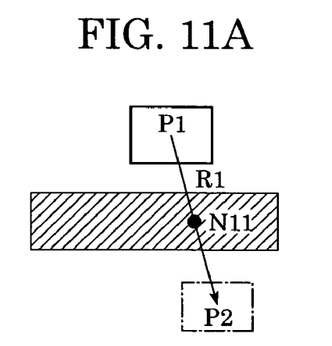
FIGS. 11A to 11D illustrate a principle of automatic creation of a detour to avoid the visible-range limited area.

A method for obtaining an appropriate route will be described with reference to FIGS. 11A to 11D. As shown in FIGS. 11A to 11D, a shooting prohibited area is located between preset points P1 and P2. FIG. 11A shows a straight (shortest) route from point P1 to point P2. In this case, the route crosses the shooting prohibited area. On the straight line, point N11 is the closest point to the shooting prohibited area. In the shooting prohibited area, the distance between every point on the straight line and the shooting prohibited area is zero. Therefore, point N11 is the closest point to the center of mass of the shooting prohibited area.

Figure 11B:
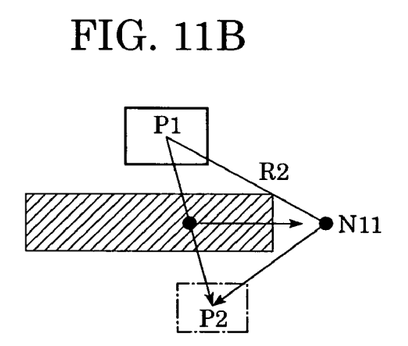
Figure 11C:
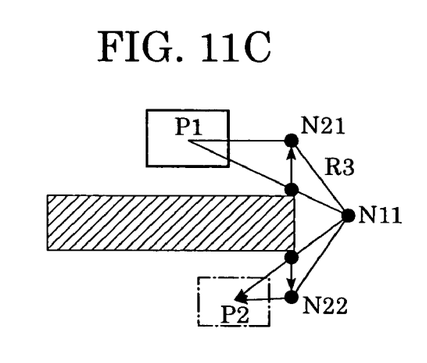
Figure 11D:
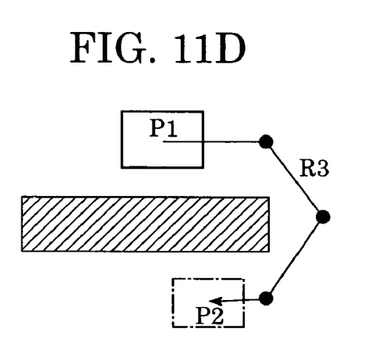

Next, point N11 is moved leftward, rightward, upward, or downward. The moving direction is the closest direction to the direction perpendicular to the straight route and away from the center of mass of the shooting prohibited area. Point N11 is moved so that the distance between point N11 and the shooting prohibited area is (½+α) of the diagonal of the field of view. In this case, point N11 is moved rightward as shown in FIG. 11B. The value of α is an appropriate positive value, which is not specified here. As a result, a new route R2 is obtained.

In the case of the route R2 in FIG. 11B, the field of view still overlaps the shooting prohibited area. Therefore, each line segment of the route R2 is processed in the same way as above, and new nodes N21 and N22 and a new route R3 are created. In the case of the route R3, the field of view does not overlap the shooting prohibited area. Eventually, the route includes four line segments and three nodes. Although the nodes are moved leftward, rightward, upward, or downward in FIGS. 11A to 11D, the nodes may be moved in the direction perpendicular to the route and away from the center of mass of the shooting prohibited area.

Figure 12:
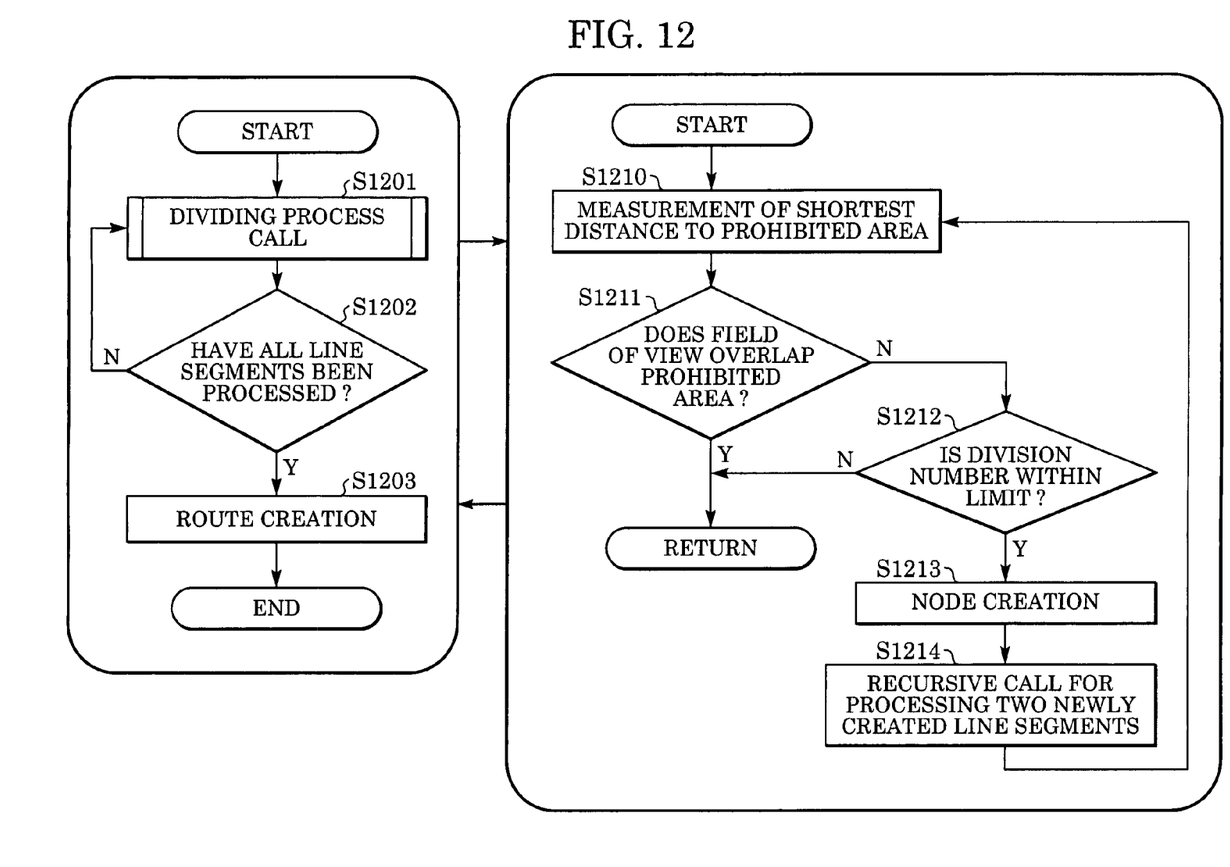
FIG. 12 illustrates a procedure of automatic creation of a detour to avoid the visible-range limited area.

Procedure of the above route creation will be described with reference to the flow chart of FIG. 12. The route dividing process from S1210 to S1214 is applied to all line segments constituting a route.

In S1201, the route dividing process from S1210 to S1214 is called and applied to the first line segment to be processed. First, in S1210, the shortest distance from the line segment to the prohibited area is measured. Next, in S1211, it is determined whether the field of view overlaps any shooting prohibited areas. If the field of view does not overlap any shooting prohibited areas, the route dividing process is exited. If the field of view overlaps any shooting prohibited areas, it is determined whether the division number is within the limit in S1212. If the division number exceeds the limit, the division is stopped. If the division number is within the limit, the closest point is shifted so as to create a new node and two new line segments in S1213. Next, in S1214, the route dividing process from S1210 to S1214 is called recursively so as to process the two newly created line segments.

After returning from the dividing process to S1201, it is determined in S1202 whether all line segments have been processed. If not all line segments have been processed, a return to S1201 is made and the dividing process is continued. If all line segments have been processed, the processing result is formatted into route data in S1203.

In the above method, the number of new route creation is limited. Depending on the shape of the shooting prohibited area and the relation between the shooting prohibited area and the preset points, in some cases, it is impossible to create a new route that does not overlap the shooting prohibited area. In such cases, during the movement of the camera, the image is blocked. As a result, the preset tour can be performed without shooting the shooting prohibited area.

The route creation according to this embodiment may be performed, for example, before the camera control S902 in FIG. 9.

As is clear from the above description, the method of this embodiment is used for a preset tour in which a visible-range limited area is specified in units of blocks, and makes it possible to perform the preset tour by making a detour to avoid the visible-range limited area.

Other Embodiments

In the above embodiments, parameters for controlling the camera and determining the shooting prohibited state are pan angle and tilt angle. However, the present invention is not limited to this. The parameter may be zoom factor, focus, exposure, shutter speed, white balance, backlight correction factor, or a combination of these. For example, the shooting prohibited state may be determined by pan angle and zoom factor.

Of course, part or all of the process according to the present invention may be performed by software running on the camera client.

Software program codes for carrying out the functions of the above embodiments are stored in a storage medium. The storage medium is supplied to a system or an apparatus. The computer (or the CPU or MPU) of the system or apparatus reads out and executes the program codes stored in the storage medium.

In this case, the program codes read out from the storage medium carry out the functions of the above embodiments, and the storage medium that stores the program codes constitutes the present invention. The storage media for supplying the program codes include a floppy disk, a hard disk, an optical disk, a magneto-optical disk, a CD-ROM, a CD-R, a magnetic tape, a nonvolatile memory card, and a ROM. The functions of the above embodiments are carried out not only by the program codes that are read out and run on the computer but also by an OS (operating system) on the computer, the OS performing part or all of the actual process according to the instructions from the program codes.

The functions of the above embodiments are also carried out by a CPU provided on a function expansion board inserted into the computer or provided in a function expansion unit connected to the computer. The CPU performs part or all of the actual process according to the instructions from the program codes that are read out from the storage medium and written into a memory provided on the function expansion board or in the function expansion unit.

The functions of the above embodiments are also carried out by running a program downloaded via a network from an apparatus including the above storage medium.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-188246 filed Jun. 25, 2004, which is hereby incorporated by reference herein.

What is claimed is:

1. A control apparatus controlling an imaging device, the apparatus comprising:
    a motion detection device detecting a moving object in shot images; and
    a control device moving a shooting area of the imaging device to a pan direction and a tilt direction in accordance with coordinates of the moving object detected by the motion detection device until one of coordinates in one of the pan direction and the tilt direction of the shooting area in a shooting permitted area reaches a shooting inhibited area, and moving the shooting area of the imaging device to the other one of the pan direction and the tilt direction in accordance with the coordinates of the moving object detected by the motion detection device while keeping the coordinates in the one of the pan direction and the tilt direction after the one of the coordinates in the one of the pan direction and the tilt direction of the shooting area reaches the shooting inhibited area.

2. The control apparatus according to claim 1, wherein the shooting prohibited state includes a state in which one of a value of pan angle and a value of tilt angle is within a visible-range limited area determined by specifying one of permission and denial of shooting in units of divided areas of the field of view, and wherein the control device stops controlling the parameter when the value of one of the pan angle and the tilt angle is within the visible-range limited area.

3. The control apparatus according to claim 1, wherein the shooting prohibited state includes a state in which one of a value of pan angle and a value of tilt angle is within a visible-range limited area, and wherein the control device controls the parameter according to one of a first priority level and a second priority level, the first priority level prohibiting the control device controlling into the visible-range limited area, the second priority level permitting the control device controlling into the visible-range limited area.

4. The control apparatus according to claim 3, wherein when an importance of the moving area is high, the control device controls the imaging device according to the second priority level even if the moving area is within the visible-range limited area.

5. The control apparatus according to claim 1, further comprising a storage device storing a control state of the imaging device, wherein the control device controls the imaging device cyclically in order based on the control state stored in the storage device.

6. The control apparatus according to claim 5, further comprising:
    the shooting prohibited state including a state in which one of a value of pan angle and a value of tilt angle is within a visible-range limited area determined by specifying one of permission and denial of shooting in units of divided areas of the field of view;
    a route creating device creating a new visiting route that does not pass through the visible-range limited area in the cyclic control by the control device, wherein the route creating device converts an original straight route into a bent route including a plurality of line segments.

7. The control apparatus according to claim 6, wherein the route creating device creates the bent route by shifting a point located on the original route and closest to the visible-range limited area away from the visible-range limited area.

8. The control apparatus according to claim 5, wherein when the moving area of images is detected by the motion detection device in each control state in the cyclic control of the control device, the control device stops visiting and points the imaging device at the moving area.

9. The control apparatus according to claim 8, wherein when the imaging device is pointed at the moving area by the control device, the control device controls zoom so as to enlarge the moving area.

10. The control apparatus according to claim 8, wherein after the imaging device is pointed at the moving area by the control device, the control device successively performs the control process according to the moving area detected by the motion detection device, and wherein when any movement is not detected in the motion detection for a predetermined time, the control device resumes the cyclic control.

11. The control apparatus according to claim 10, wherein the control device resumes the cyclic control from a first control state.

12. The control apparatus according to claim 10, wherein the control device resumes the cyclic control from a last control state.

13. The control apparatus according to claim 10, wherein the control device resumes the cyclic control from the nearest pan-tilt position.

14. The control apparatus according to claim 1, wherein the motion detection device detects the moving object in a first area, and the moving object is tracked by the control device in a second area wider than the first area.

15. The control apparatus according to claim 1, wherein the control device controls such that the shooting area of the imaging device is moved to a predetermined position if the moving object is lost while the control device is tracking the moving device.

16. The control apparatus according to claim 1, wherein the shooting inhibited area has a shape of a rectangle.

17. A method for controlling an imaging device, the method comprising the steps of:
 detecting a moving object in shot images;
 moving a shooting area of the imaging device to a pan direction and a tilt direction in accordance with coordinates of the detected moving object until one of coordinates in one of the pan direction and the tilt direction of the shooting area in a shooting permitted area reaches a shooting inhibited area, and moving the shooting area of the imaging device to the other one of the pan direction and the tilt direction in accordance with the coordinates of the detected moving object while keeping the coordinates in the one of the pan direction and the tilt direction after the one of the coordinates in the one of the pan direction and the tilt direction of the shooting area reaches the shooting inhibited area.

18. The method according to claim 17, wherein the detecting step includes detecting the moving object in a first area, and the moving object is tracked in the controlling step in a second area wider than the first area.

19. The method according to claim 17, wherein the moving step moves the shooting area of the imaging device to a predetermined position if the moving object is lost while the moving device is being tracked in the controlling step.

20. The method according to claim 17, wherein the shooting inhibited area has a shape of a rectangle.

21. A storage medium storing program codes for performing a method for controlling an imaging device, the method comprising the steps of:
 detecting a moving object in shot images;
 moving a shooting area of the imaging device to a pan direction and a tilt direction in accordance with coordinates of the detected moving object until one of coordinates in one of the pan direction and the tilt direction of the shooting area in a shooting permitted area reaches a shooting inhibited area, and moving the shooting area of the imaging device to the other one of the pan direction and the tilt direction in accordance with the coordinates of the detected moving object while keeping the coordinates in the one of the pan direction and the tilt direction after the one of the coordinates in the one of the pan direction and the tilt direction of the shooting area reaches the shooting inhibited area.

22. The storage medium according to claim 21, wherein the detecting step includes detecting the moving object in a first area, and the moving object is tracked in the controlling step in a second area wider than the first area.

23. The storage medium according to claim 21, wherein the moving step moves the shooting area of the imaging device to a predetermined position if the moving object is lost while the moving device is being tracked in the controlling step.

24. The storage medium according to claim 21, wherein the shooting inhibited area has a shape of a rectangle.

* * * * *